United States Patent
Carron

(10) Patent No.: US 8,803,885 B1
(45) Date of Patent: Aug. 12, 2014

(54) METHOD FOR EVALUATING SPLINE PARAMETERS FOR SMOOTH CURVE SAMPLING

(75) Inventor: David McLean Carron, Saint Martin d'Uriage (FR)

(73) Assignee: Infragistics, Inc., Cranbury, NJ (US)

( * ) Notice: Subject to any disclaimer, the term of this patent is extended or adjusted under 35 U.S.C. 154(b) by 496 days.

(21) Appl. No.: 13/226,728

(22) Filed: Sep. 7, 2011

(51) Int. Cl.
*G06T 11/20* (2006.01)

(52) U.S. Cl.
USPC .......................................................... 345/442

(58) Field of Classification Search
None
See application file for complete search history.

(56) References Cited

U.S. PATENT DOCUMENTS

| | | | |
|---|---|---|---|
| 6,256,039 B1 * | 7/2001 | Krishnamurthy | 345/420 |
| 6,782,306 B2 * | 8/2004 | Yutkowitz | 700/189 |
| 6,922,606 B1 * | 7/2005 | Yutkowitz | 700/187 |
| 6,937,235 B2 | 8/2005 | Fujiwara et al. | |
| 7,899,266 B2 | 3/2011 | Mitsunaga | |
| 7,917,342 B2 * | 3/2011 | Miura et al. | 703/2 |
| 8,471,855 B2 * | 6/2013 | Higuchi et al. | 345/443 |
| 2003/0033050 A1 * | 2/2003 | Yutkowitz | 700/189 |
| 2008/0143726 A1 | 6/2008 | Lee et al. | |
| 2009/0027398 A1 * | 1/2009 | Frisken | 345/442 |
| 2009/0225078 A1 | 9/2009 | Rossignac et al. | |
| 2010/0271371 A1 | 10/2010 | Chang et al. | |
| 2011/0261072 A1 * | 10/2011 | Kadomura et al. | 345/619 |

FOREIGN PATENT DOCUMENTS

| | | |
|---|---|---|
| EP | 0 567 195 A2 | 10/1993 |
| EP | 1 049 049 A2 | 11/2000 |
| GB | 2459038 A | 10/2009 |
| JP | 5128269 A | 5/1993 |
| JP | 9044543 A | 2/1997 |
| JP | 2001-034774 A | 2/2001 |

OTHER PUBLICATIONS

"Parameter Optimization in Approximating Curves and Surfaces to Measurement Data", Biplab Sarkar and Chia-Hsiang Menq. Downloaded Abstract only from: http://www.sciencedirect.com/science/articie/pii/0167839691900165.

"Parameterization of Randomly Measured Points for Least Squares Fitting of B-Spline Curves and Surfaces", Weiyin Ma and JP Kruth, Downloaded Abstract only from: http://www.sciencedirect.com/science/article/pii/0010448594000189.

* cited by examiner

*Primary Examiner* — Ryan R Yang
(74) *Attorney, Agent, or Firm* — Moser Taboada

(57) ABSTRACT

A computer implemented method and apparatus for reproducing an input curve on a mobile device comprising detecting the input curve, sampling the input curve into a discrete set of vertices, performing a normalized dot product of an edge leading into each one of the discrete set of vertices and a tangent to an edge leading from each one of the discrete set of vertices, setting one or more spline stiffness parameter based on the normalized dot product corresponding to each vertex; and converting the sampled input curve into one or more spline patch with the set spline stiffness parameter corresponding to each vertex.

12 Claims, 4 Drawing Sheets

METHOD FOR EVALUATING SPLINE PARAMETERS FOR SMOOTH CURVE SAMPLING

BACKGROUND OF THE INVENTION

1. Field of the Invention

Embodiments of the present invention generally relate to techniques for representing an input curve on a display, more particularly, to a method and apparatus for evaluating a spline constant to enable optimal sampling of user input curves.

2. Description of the Related Art

In order to estimate the motion performed by a user, curves input via mouse on a computer or laptop, or through touch input on a tablet device are sampled by software in the operating system of the device onto a discrete grid. The discrete grid is used to generate spline curves representing each discrete portion of the user's input motion. Each spline curve is created using control points and a stiffness parameter used to control the curvature of the spline. When reproducing at the sampling resolution, the sampled curve represents a visually close match to the original input curve. However, when the display resolution is changed by zooming in on the curve, the sampling frequency becomes inappropriate for display, resulting in excessive rendering overhead and visible staircase-like artifacts. This occurs because the spline curves created for representing each discrete portion of the user's input motion are represented poorly by their control points and stiffness parameters resulting in jagged curves.

Therefore, there is a need in the art for a method and apparatus for evaluating spline parameters for smooth curve sampling, wherein optimal results are guaranteed.

SUMMARY OF THE INVENTION

Embodiments of the present invention relate to a computer implemented method for reproducing an input curve on a mobile device comprising detecting the input curve, sampling the input curve into a discrete set of vertices, performing a normalized dot product of an edge leading into each one of the discrete set of vertices and a tangent to an edge leading from each one of the discrete set of vertices, setting one or more spline stiffness parameter based on the normalized dot product corresponding to each vertex and converting the sampled input curve into one or more spline patch with the set spline stiffness parameter corresponding to each vertex.

Embodiments of the present invention further relate to 7. An apparatus for reproducing an input curve comprising a detector for detecting the input curve a sampler, coupled to the detector, for sampling the input curve into a discrete set of vertices, a normalizer, coupled to the sampler, for performing a normalized dot product of an edge leading into each one of the discrete set of vertices and computing a tangent to an edge leading from each one of the discrete set of vertices and a spline generator, coupled to the normalizer, for setting a spline stiffness parameter based on the calculation corresponding to each vertex and converting the sampled input curve into one or more spline patch with the set spline stiffness parameter corresponding to each vertex.

BRIEF DESCRIPTION OF THE DRAWINGS

So that the manner in which the above recited features of embodiments of the present invention can be understood in detail, a more particular description of the invention, briefly summarized above, may be had by reference to typical embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention relate to a computer implemented method and apparatus for evaluating spline parameters for smooth curve sampling. In an exemplary embodiment, the present invention detects a set of two-dimensional vertices representing a curve, from an input device such as a mouse or a tablet device touch screen. For each vertex, tangent vectors are computed, estimated and normalized. Then, a stiffness parameter is determined for each vertex using the dot product of the tangent vectors for a vertex. Using the stiffness parameter, control points for the spline curve are calculated between each vertex.

Figure 1:
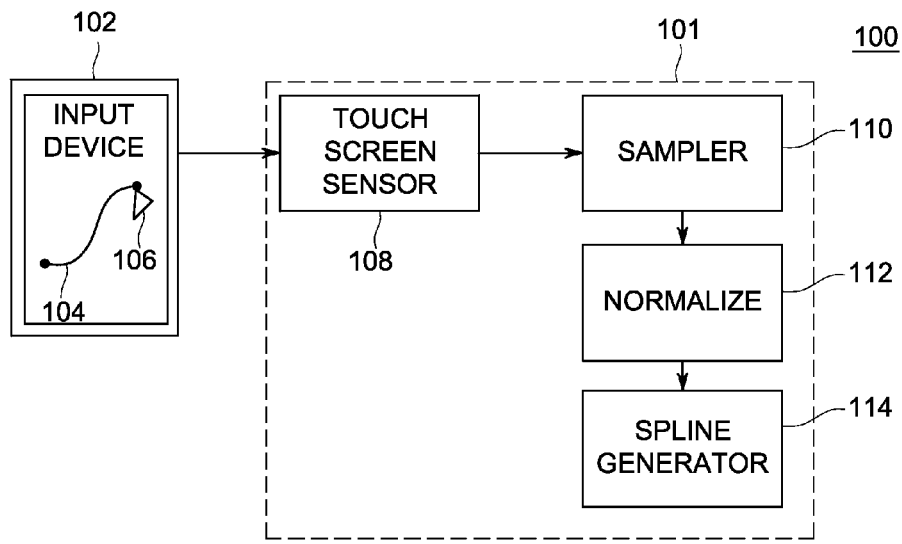
FIG. 1 is a functional diagram of an exemplary embodiment of an apparatus for evaluating spline parameters for smooth curve sampling accordance with one or more embodiments of the present invention.

FIG. 1 is a functional diagram of an exemplary embodiment of an apparatus 100 for evaluating spline parameters for smooth curve sampling accordance with one or more embodiments of the present invention. In an exemplary embodiment, a user inputs an input curve 104 by a mouse 106 on a device 102. The touch screen sensor then senses the input curve 104 and sends the curve to the spline processing module 101. The spline processing module 101 first invokes the sampler 108. The sampler 108 digitizes the input curve 104 into a discrete grid and samples it as a set of vertices. The sampler 108 then sends the set of vertices to the normalizer 112 to compute tangents for a leading and trailing edge of a vertex and to normalize the tangents. The normalized tangents and the vertices are sent to the spline generator 114, which calculates stiffness parameters, control points and spline patches based on the stiffness parameter and control points. This embodiment of the present invention relates to detecting mouse 106 movement as the input curve 104, however, those of ordinary skill in the art will recognize that the input of the curve 104 is not limited to being created by a mouse, but may also be a finger input on a touch pad, a physical movement of the device and the like.

Figure 2:
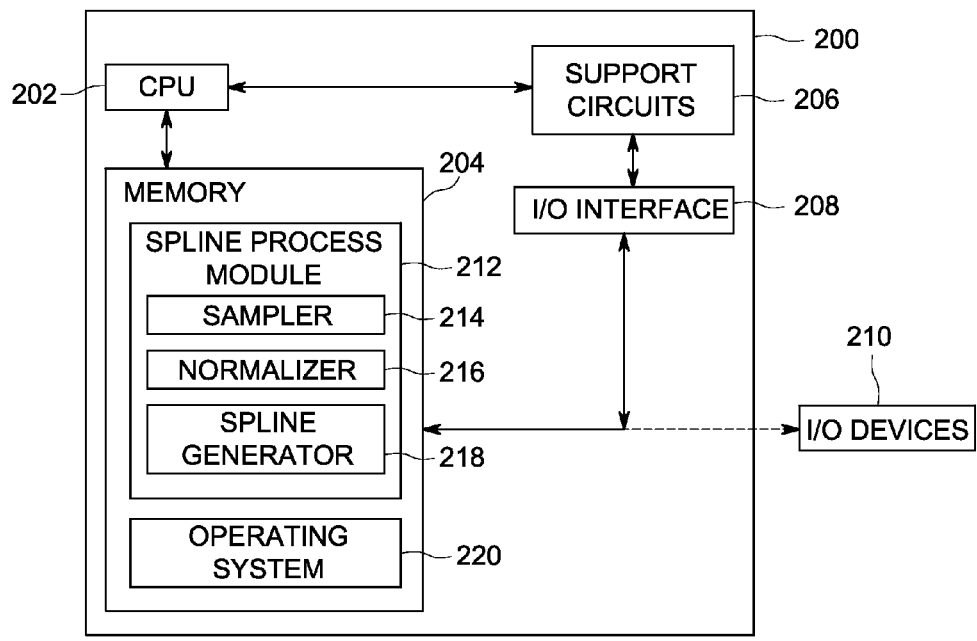
FIG. 2 is a block diagram depicting an exemplary embodiment of a computer system in accordance with one or more aspects of the invention.

FIG. 2 is a block diagram depicting an exemplary embodiment of a computer system 200 in accordance with one or more aspects of the invention. The computer system 200 may be used to implement the apparatus 100 for evaluating spline parameters (shown in FIG. 1). The computer system 200 includes a processor 202, a memory 204 and various support circuits 206. The processor 202 may include one or more microprocessors known in the art. The support circuits 206 for the processor 202 include conventional cache, power supplies, clock circuits, data registers, I/O interfaces 208, and the like. The I/O interface 208 may be directly coupled to the memory 204 or coupled through the supporting circuits 206. The I/O interface 208 may also be configured for communication with input devices and/or output devices 210, such as, network devices, various storage devices, mouse, keyboard, displays, sensors and the like.

The memory 204 stores non-transient processor-executable instructions and/or data that may be executed by and/or used by the processor 202. These processor-executable instructions may comprise firmware, software, and the like, or some combination thereof. Modules having processor-executable instructions that are stored in the memory 204 comprise a spline processing module 212. As described below, in an exemplary embodiment the spline processing module 212 contains a sampler 214, which digitizes and samples input from an I/O device 210, a normalizer 216 which computes tangents of vectors and normalizes them and a spline generator 218 which generates spline curves based on the output of the normalizer 216. The computer system 200 may be programmed with one or more operating systems (generally referred to as operating system (OS) 220), which may include OS/2, Java Virtual Machine, Linux, Solaris, Unix, HPUX, AIX, Windows, Windows95, Windows98, Windows NT, and Windows2000, WindowsME, WindowsXP, Windows Server, among other known platforms. At least a portion of the operating system 220 may be disposed in the memory 204. The memory 204 may include one or more of the following random access memory, read only memory, magneto-resistive read/write memory, optical read/write memory, cache memory, magnetic read/write memory, and the like, as well as signal-bearing media as described below.

Figure 3:
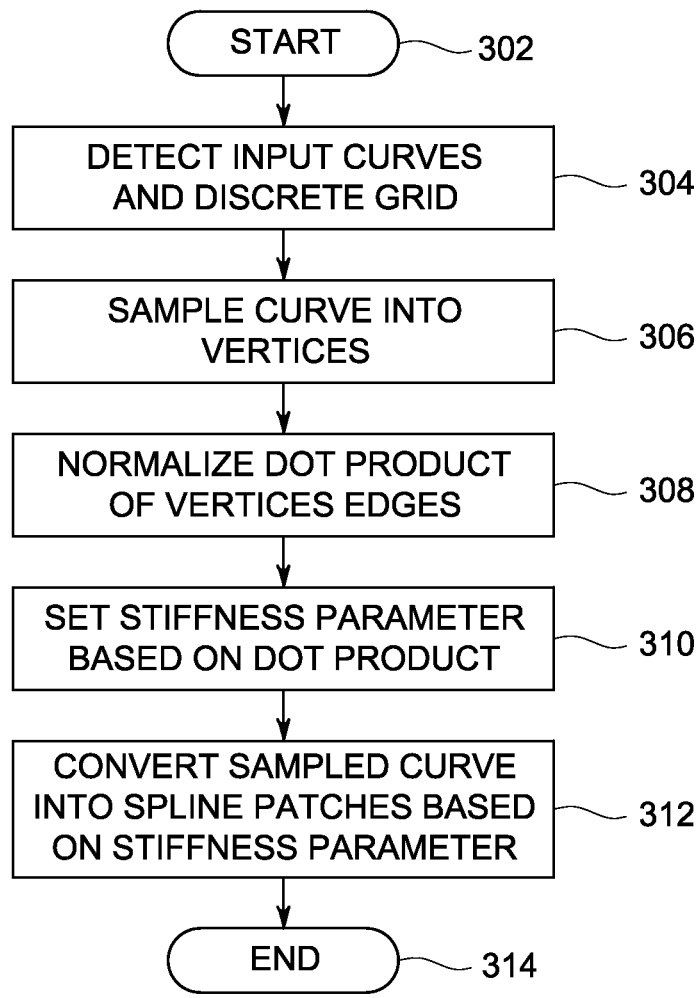
FIG. 3 is a flow diagram of a method for reproducing an input curve on a mobile device according to an exemplary embodiment of the present invention.

FIG. 3 is a flow diagram of a method 300 for reproducing an input curve on a mobile device according to an exemplary embodiment of the present invention. FIG. 3 represents operation of the apparatus 100 as implemented in the computer system 200, where the spline processing module 101 of FIG. 1 is stored in memory 204 as module 212 and executed by the processor 202. According to FIG. 3, the method 300 starts at step 302 and proceeds to step 304. At step 304, the user input curve is detected by a sensor. In an exemplary embodiment, the user inputs the curve by use of a mouse. In another exemplary embodiment, the user inputs the curve by his or her finger through the use of a touch screen, and the touch screen sensor conveys the input to the processor 202. At step 306, the curve is sample on a discrete grid and converted into a series of vertices. The method 300 then proceeds to step 308, where the dot product between a leading edge and a tangent leading from a current vertex is computed and normalized. This dot product calculation is used in calculating a stiffness parameter at step 310 corresponding to that vertex. At step 312, the method converts the sampled curved into spline patches each based on the stiffness parameter of the vertex they represent. The method 300 ends at step 314.

Figure 4:
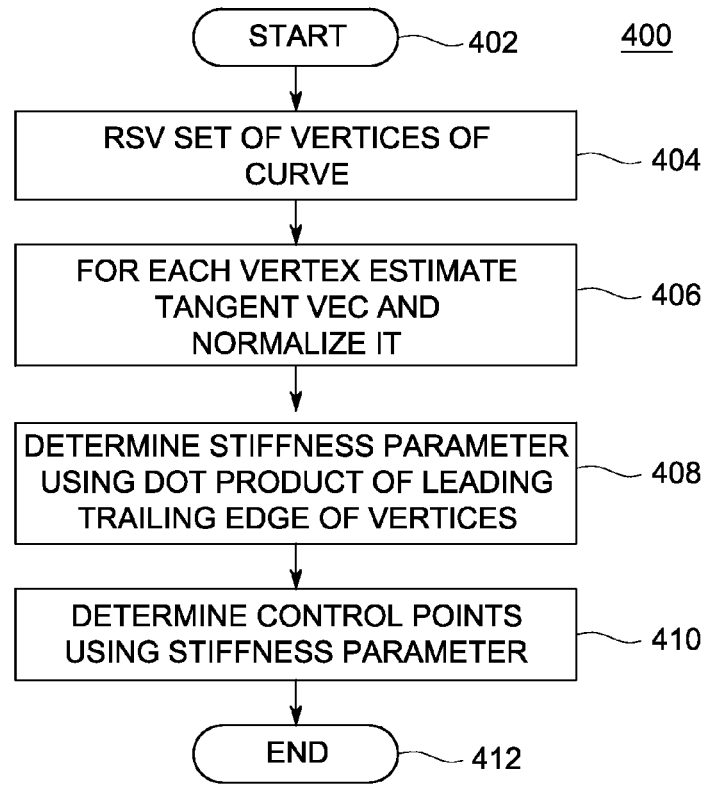
FIG. 4 is a flow diagram of a method for reproducing an input curve on a mobile device according to an exemplary embodiment of the present invention.

FIG. 4 is a flow diagram of a method 400 for reproducing an input curve on a mobile device according to an exemplary embodiment of the present invention. The method 400 starts at step 402 and proceeds to step 404. At step 404, the method 400 receives a set of vertices representing a curve. At step 406, for each vertex, tangent vectors are calculated and normalized using the following formula: $t=(v_{i+1}-v_{i-1})/|v_{i+1}-v_{i-1}|$. t represents the tangent curve and $v_{i+1}$ and $v_{i-1}$ respectively represent the next vertex in the series and the immediately preceding vertex in the series. At step 408, a dot product of the leading edge into the current vertex and the tangent of the trailing edge of the vertex is calculated and used as the basis for a stiffness parameter. The stiffness parameter is used to configure the locally interpolated spline patch between two vertices. The formula for calculating the dot product is given as $d=[(v_i x - v_{i-1} x)(v_{i+1} y - v_i y)+(v_i y - v_{i-1} y)(v_i x - v_{i+1} x)]/[|v_{i+1}-v_i||v_i-v_{i-1}|]$, where $v_i$ is the current vertex being operated on, $v_{i+1}$ and $v_{1-1}$ respectively represent the next vertex in the series and the immediately preceding vertex in the series and x and y are an x and y coordinate of the current vertex. The stiffness parameter for this local vertex is computed as $k=(d+1)/2$. At step 410, the control points for the vertex are determined according to the stiffness parameter k, and evaluated according to: $a_i=v_i-[kt/(2|v_i-v_{i-1}|)]$ and $b_i=v_i-[kt/(2|v_{i-1}-v_i|)]$ where $v_i$ is the current vertex, k is the spline stiffness parameter and $v_{i-1}$ is a previous vertex in the set of vertices. Here, $a_i$ is the first control point, and $b_i$ is the second control point for an interpolating spline patch. One of ordinary skill will recognize that one control point can also be used for the spline patch, but two control points are used in the present embodiment. Spline curves using two control points are referred to as cubic spline curves. However, one of ordinary skill in the art would recognize that other types of spline curves may be substituted instead of cubic spline curves.

Figure 5:
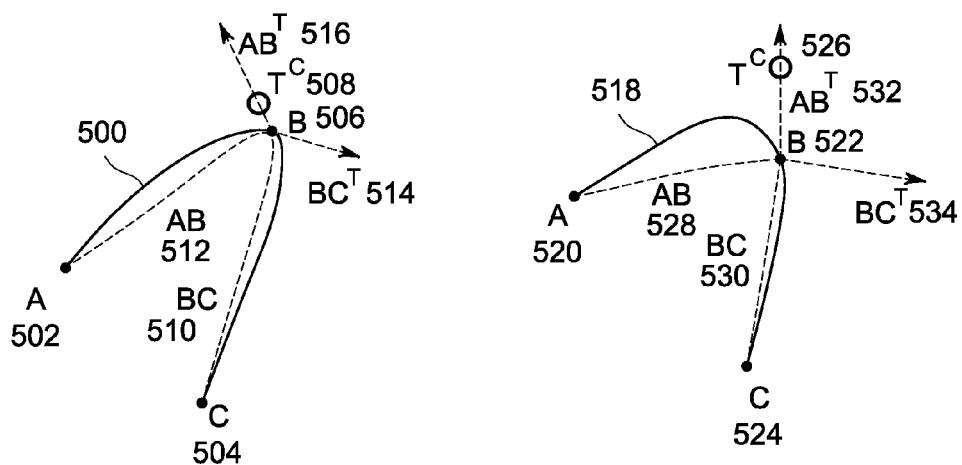
FIG. 5 is an illustration of a spline curve and a control point determining its sharpness.

FIG. 5 is an illustration of a spline curve 500 where a control point determines the sharpness of the curve. According to FIG. 5, in an exemplary embodiment, the vertices A 502, B 504 and C 506 have been sampled according to method 400 above. The control point TC 508 represents the curvature of the spline curve 500 drawn between vertices A 502, B 504 and C 506. For purposes of clarity, a spline curve being drawn through three vertices is shown; however, in exemplary embodiments of the present invention, a spline curve is generated connecting two vertices. When the control point TC 508 is close to the vertex B 504, the spline curve sharply turns towards vertex C 506. As discussed above, the dot product of the leading edge $AB^T$ 516 and tangent $BC^T$ 514 of the trailing edge of a vertex are calculated. This dot product represents a sharpness of the spline curve 500, i.e., how angled the spline curve 500 is. This is because the dot product of the vectors $AB^T$ 516 and $BC^T$ 514 is closer to −1 according to the following formula:

$$d = \frac{\vec{AB} \cdot \vec{BC^T}}{\left|\vec{AB}\right|\left|\vec{BC^T}\right|} = \frac{(v_i x - v_{i-1} x)(v_{i+1} y - v_i y) + (v_i y - v_{i-1} y)(v_i x - v_{i+1} x)}{|v_{i+1}-v_i||v_i-v_{i-1}|}.$$

This formula results in d=1 for no turn, d=0 for a ninety degree turn and d=−1 for a U-turn at the vertex. This allows for sharper corners in the original shape to be automatically evaluated with a locally stiff spline and smoother corners with a locally more relaxed spline (such as spline 518) resulting in a more visually appealing curve. The points A 520, B 522 and C 524 form the spline curve 518. $T^C$ 526 is the control point for the spline 518 and the vectors $AB^T$ 532 and $BC^T$ 534 are the tangent vectors at vertex B 522. Control point $T^C$ 526 has been moved further away from vertex B 522, therefore the curve 518 is not as sharp as curve 500. This is because the dot product of $AB^T$ 532 and $BC^T$ 534 is closer to zero, thus an almost ninety degree angled turn in the spline 518 as opposed to the 180 degree angle turn in spline 500. In an exemplary embodiment of the present invention controlling the location of the control point creates locally stiff spline curves as well as locally relaxes spline curves resulting in aesthetically and visually pleasing smooth curves representing a user's mouse or touch motion.

Figure 6:
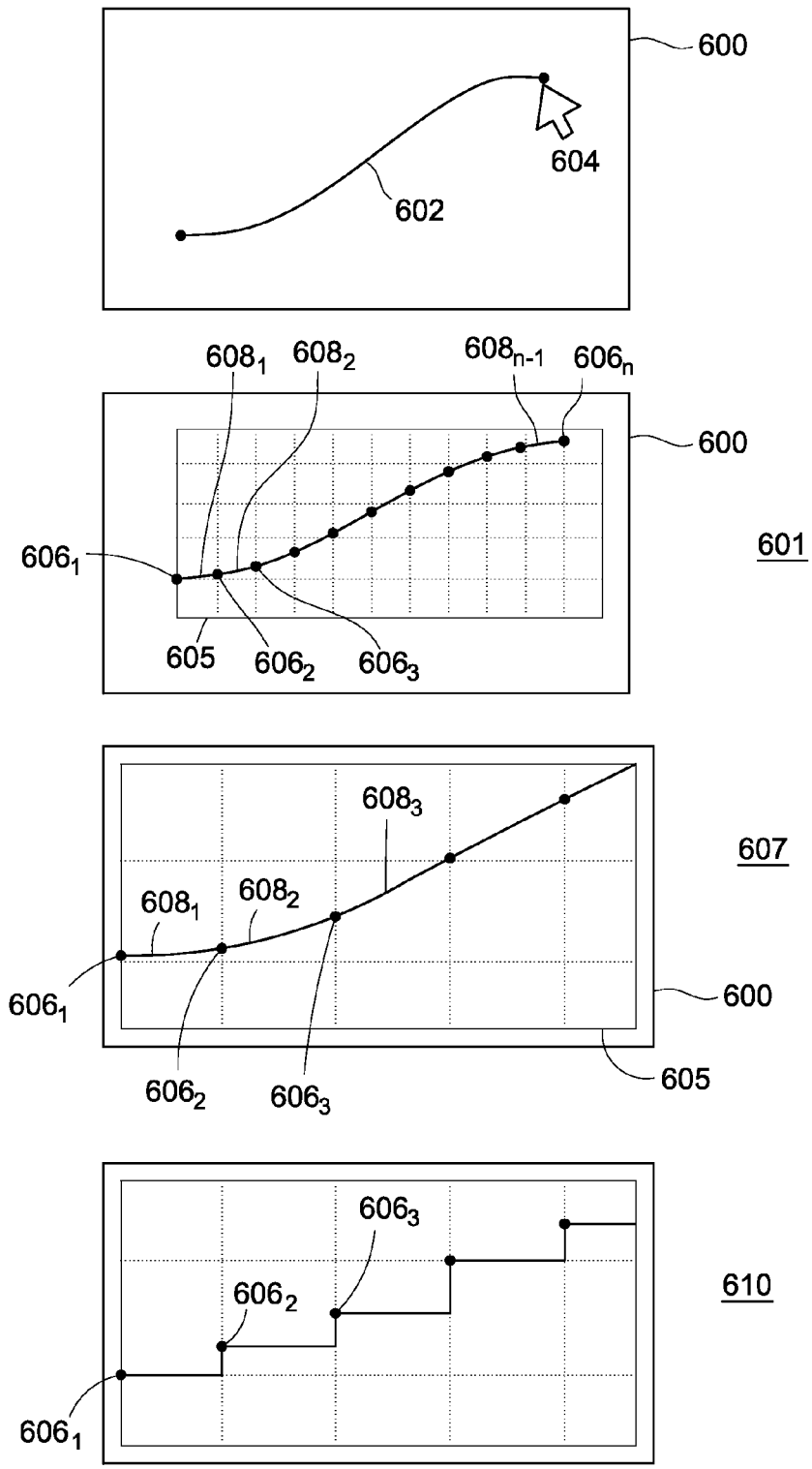
FIG. 6 is an illustration of a reproduction of an input curve on a mobile device according to an exemplary embodiment of the present invention.

FIG. 6 is an illustration of a reproduction of an input curve on a mobile device according to an exemplary embodiment of the present invention. A user using a mobile device with display 600 uses a mouse 604 to input a motion curve 602. One of ordinary skill in the art would recognize that although in this embodiment a mouse was used to enter the input, the present invention does not exclude other types of input such as touch input and the like. According to method 300, in 601 it is shown that the curve 602 is sampled into a discrete grid 605 into a set of discrete vertices, $606_1, 606_2 \ldots 606_n$. As discussed above with regards to method 300, the sampled curve 602 is converted into a series of spline curves $608_1, 608_2 \ldots 608_{n-1}$. Screen 607 shows a user increasing the resolution or zooming into a particular location of the input curve 602. In this exemplary embodiment of the present invention, the reproduction of curve 602 using spline patches $608_1, 608_2 \ldots 608_{n-1}$ and the curve 602 is smooth and not jagged as may be expected because the segments between the vertices $606_1, 606_2,$ and $606_3$ for example, are mathematically represented spline curves $608_1$ and $608_2$. Therefore, at any resolution the spline curves $608_1$ and $608_2$ will be smooth and continuous curves appearing in a visually pleasing manner and there will be no stair-casing effects as shown in 610. In 610, the curve 602 is shown with locally unsmoothed spline patches without a localized stiffness parameter used to represent the curve between vertices. Curve 602 in 610 would look smooth when zoomed out to a similar resolution as 601. However, when zoomed in as in 610, the curve would exhibit stair-casing effects.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, and modules are described above in association with their respective functions. These elements, devices, and modules are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. A computer implemented method for reproducing an input curve on a mobile device comprising:
    detecting the input curve;
    sampling the input curve into a discrete set of vertices;
    performing a normalized dot product of an edge leading into each one of the discrete set of vertices and a tangent to an edge leading from each one of the discrete set of vertices;
    setting one or more spline stiffness parameter based on the normalized dot product corresponding to each vertex; and
    converting the sampled input curve into one or more spline patch with the set spline stiffness parameter corresponding to each vertex.

2. The method of claim 1, further comprising:
    calculating a tangent for each vertex in the set of vertices; and
    calculating two control points for each vertex in the set of vertices based on the corresponding tangent and the spline stiffness parameter.

3. The method of claim 1 wherein the normalized dot product is calculated according to the following formula: $d=[(v_ix-v_{i-1}x)(v_{i+1}y-v_iy)+(v_iy-v_{i-1}y)(v_ix-v_{i+1}x)]/[|v_{i+1}-v_i||v_i-v_{i-1}|]$ where $v_i$ is a current vertex in the set of vertices, $v_{i-1}$ is a previous vertex in the set of vertices, $v_{i+1}$ is a next vertex in the set of vertices and x and y are an x and y coordinate of the current vertex.

4. The method of claim 1, wherein the spline stiffness parameter is evaluated according to the following formula: $k=(d+1)/2$.

5. The method of claim 2 wherein the tangent of the each vertex is calculated according to the following formula: $t=(v_{i+1}-v_{i-1})/|v_{i+1}-v_{i-1}|$, where $v_{i+1}$ is a next vertex in the set and $v_{i-1}$ is a previous vertex in the set.

6. The method of claim 2 wherein the two control points of the each vertex are calculated according to the following formulas: $a_i=v_i-[kt/(2|v_i-v_{i-1}|)]$ and $b_i=v_i-[kt/(2|v_{i-1}-v_i|)]$ where $v_i$ is the current vertex, k is the spline stiffness parameter and $v_{i-1}$ is a previous vertex in the set of vertices.

7. An apparatus for reproducing an input curve comprising:
    a detector for detecting the input curve;
    a sampler, coupled to the detector, for sampling the input curve into a discrete set of vertices;
    a normalizer, coupled to the sampler, for performing a normalized dot product of an edge leading into each one of the discrete set of vertices and computing a tangent to an edge leading from each one of the discrete set of vertices; and
    a spline generator, coupled to the normalizer, for setting a spline stiffness parameter based on the calculation corresponding to each vertex and converting the sampled input curve into one or more spline patch with the set spline stiffness parameter corresponding to each vertex.

8. The apparatus of claim 7, wherein the normalizer further comprises:
    calculating a tangent for each vertex in the set of vertices; and
    calculating two control points for each vertex in the set of vertices based on the corresponding tangent and the corresponding spline stiffness parameter.

9. The apparatus of claim 7 wherein the normalized dot product is calculated according to the following formula: $d=[(v_ix-v_{i-1}x) \quad (v_{i+1}y-v_iy)+(v_iy-v_{i-1}y)(v_ix-v_{i+1}x)]/[|v_{i+1}-v_i||v_i-v_{i-1}|]$ where $v_i$ is a current vertex in the set of vertices, $v_{i-1}$ is a previous vertex in the set of vertices, $v_{i+1}$ is a next vertex in the set of vertices and x and y are an x and y coordinate of the current vertex.

10. The apparatus of claim 7, wherein the spline stiffness parameter is evaluated according to the following formula: $k=(d+1)/2$.

11. The apparatus of claim 8 wherein the tangent of the each vertex is calculated according to the following formula: $t=(v_{i+1}-v_{i-1})/|v_{i+1}-v_{i-1}|$, where $v_{i+1}$ is a next vertex in the set and $v_{i-1}$ is a previous vertex in the set.

12. The apparatus of claim 8 wherein the two control points of the each vertex are calculated according to the following formulas: $a_i=v_i-[kt/(2|v_i-v_{i-1}|)]$ and $b_i=v_i-[kt/(2|v_{i-1}-v_i|)]$ where $v_i$ is the current vertex, k is the spline stiffness parameter and $v_{i-1}$ is a previous vertex in the set of vertices.

* * * * *